3,425,935
Patented Feb. 4, 1969

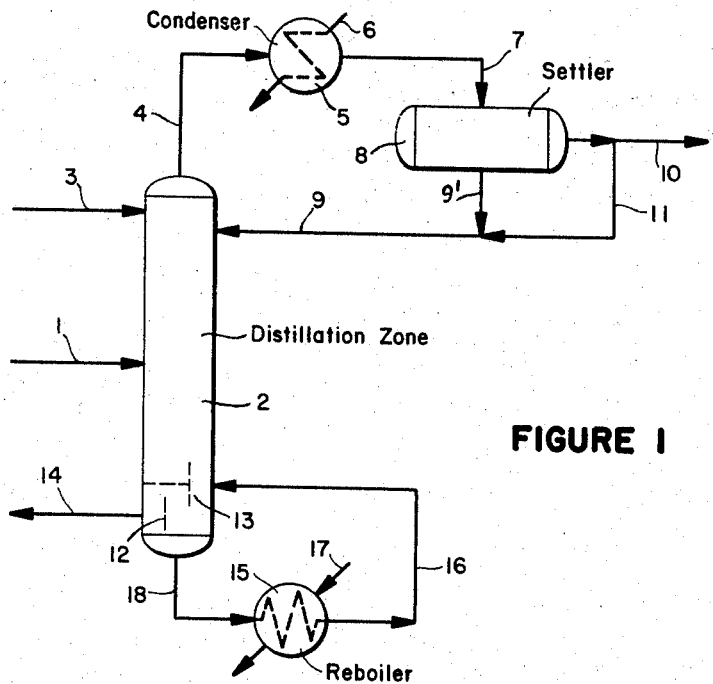
FIGURE 1
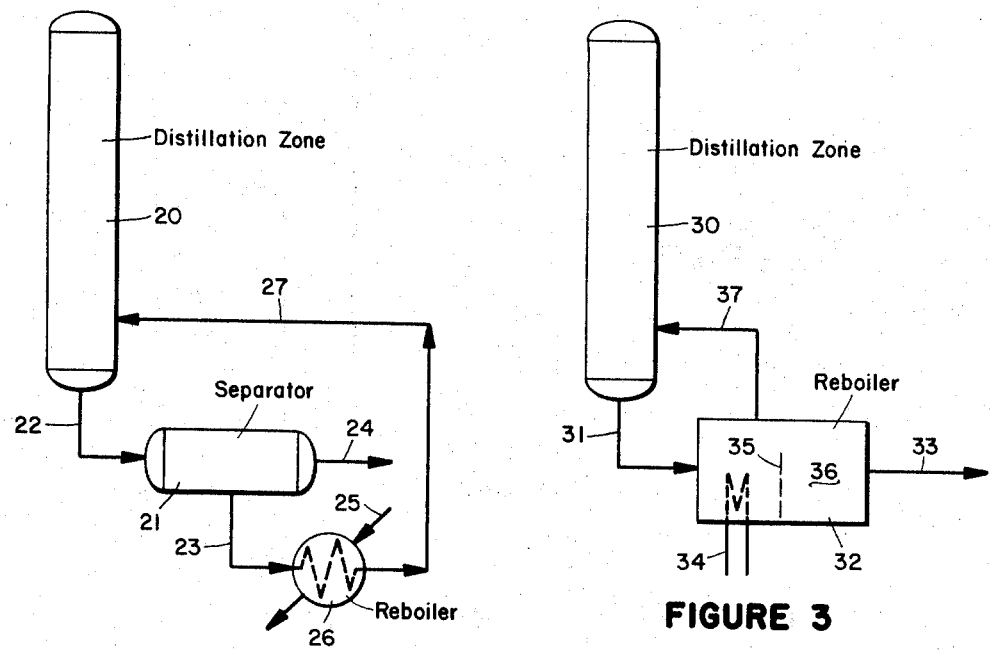
FIGURE 2
FIGURE 3
ROBERT P. CAHN  INVENTOR
BY *Perry Carnellas*
PATENT ATTORNEY _United States Patent Office_

3,425,935
DISTILLATION IN THE PRESENCE OF WATER
Robert P. Cahn, Millburn, N.J., assignor to Esso Research and Engineering Company, a corporation of Delaware
Continuation-in-part of application Ser. No. 79,248, Dec. 29, 1960. This application Oct. 9, 1964, Ser. No. 402,749
U.S. Cl. 208—348          6 Claims
Int. Cl. B01d 3/34

ABSTRACT OF THE DISCLOSURE

A method for separating a mixture of two or more fractions which are immiscible and insoluble in water by distillation. The fraction mixture is fed to a distillation tower having liquid water in all stages of the distillation zone. In the disclosure, operation of the improved (wet) system is compared with the conventional (dry) distillation system. In the improved process, separation is accomplished at a substantially lower temperature.

---

This application is a continuation-in-part of my earlier filed case, U.S. Ser. No. 79,248, filed Dec. 29, 1960, and now abandoned.

The instant invention relates to an improved method of distillation. More specifically, the instant invention relates to a distillation process wherein segregation of the constituents is effected in the presence of water.

In the past, four principal distillation methods have been employed to effect segregation of components in a mixture of feed. Common to these four methods is a distillation zone which is a tower containing trays with bubble caps, weirs, etc., so that each tray itself effects segregation of the desired component from the feed mixture. Distillation zones, as such, are well-known in the art and need not be discussed herein in detail. In the most conventional of the known distillation methods the feed mixture, which may or may not be preheated, is introduced into a distillation zone and the feed is segregated with the lower boiling constituent tending to concentrate as it travels upwardly in the distillation zone while the higher boiling constituent concentrates as it flows downwardly in the distillation zone. The heavier boiling constituents form the bottoms of the distillation zone. A portion of the bottoms is heated in a reboiler zone, generally a shell and tube heat exchanger or a furnace wherein the bottom flow inside the heat exchange tube. The choice of reboiler will be dependent upon the heat requirements of the system. The vapor from the reboiler zone is recycled to the distillation zone. The other portion of bottoms is withdrawn as product. The overhead from the distillation zone is directed to a condenser and a portion of the hondensed product recycled to the top of the tower. The remainder of the condensed overhead is withdrawn as overhead product.

Another distillation method is commonly referred to as azeotropic distillation. In this process an extraneous agent is added to the multi-component mixture which is to be separated by distillation. The extraneous agent increases the relative volatility between the components to be separated by forming an azeotrope with one of the components. This azeotrope boils sufficiently far away from the other component to permit economic fractionation. The azeotroping agent is usually added at the top of the column and is continuously withdrawn either at the top or bottom or both. The azeotroping agent is, in general, partially or completely miscible with the components to be separated. In other respects, the azeotropic distillation method is similar to the more conventional distillation discussed hereinabove in regard to the use of condensers and reboilers.

Extractive distillation is similar to azeotropic distillation, except that the extraneous agent does not form an azeotrope, but has a selectivity for the materials to be separated. It, therefore, increases their relative volatility by preferentially holding one of the components more selectively in the liquid phase. This agent is usually added and withdrawn from the columns similar to the manner in which an azeotroping agent is added to the distillation zone. The extractive distillation agent is generally miscible with the mixture to be separated.

The last of the four basic methods discussed herein is that of steam distillation. In steam distillation steam and the mixture to be segregated are passed into the distillation zone. The steam serves as a source of heat for the distillation zone and thus the use of a reboiler or furnace is unnecessary in this distillation method. The steam with the light component or components of the mixture is taken overhead from the distillation zone and the mixture of steam and light component condensed. The condensed steam is segregated from the light component, which may be a hydrocarbon, and a portion of the latter recycled to the distillation zone. The remaining portion of light component is withdrawn as overhead product. The main objection to employing steam distillation is that under certain conditions water may condense in the tower. This interferes with fractionation on the bubble cap trays and will also cause serious corrosion problems in the systems containing acidic gases.

The instant invention is directed toward improving the conventional and steam distillation methods. In conventional distillation, the disadvantages are primarily twofold. First, a furnace may be required to supply heat to the distillation zone. A furnace imposes high initial investment costs and high operating costs on the process. secondly, even if a shell and tube heat exchanger may be employed, bottoms temperatures higher than desired are frequently required in order to maintain a sufficient pressure in the tower to permit condensing the overhead product at cooling water temperatures. Thus, the pressure under which a tower handling temperature-sensitive bottoms can operate will be limited. This will be explained more fully hereinafter.

In steam distillation, the primary disadvantage is that water must be continuously removed from the system to prevent its buildup. If corrosion, polymerization, deposit or decomposition inhibitors are employed, this will cause their continuous removal from the system and necessitate the continuous addition of more inhibitors. In addition, since steam is generally not available at pressures above, say, 150 p.s.i.g. in the usual industrial plant or refinery, steam distillation is usually limited to tower pressures below 150 p.s.i.g.

It is an object of the instant invention to overcome the problems of conventional and steam distillation methods.

It is a further object of this invention to provide a distillation method wherein higher system pressure or lower reboiler temperatures may be employed.

It is still a further object of this invention to provide a distillation process wherein the inhibitor need not be continuously added during distillation.

It is a further object of the instant invention to afford a distillation method wherein a furnace is unnecessary.

It is a further object of the invention to afford a distillation method wherein intercoolers are unnecessary.

It is a further object of the instant invention to bring the overhead and bottoms temperatures close enough to permit use of vapor recompression.

It is a further object of the instant invention to provide a method wherein substantial heat economies are realized over conventional and steam distillation.

It is a further object of the instant invention to provide a method wherein, if water soluble but oil insoluble inhibitors or other chemicals are added to the distillation zone, deposition of these materials on the reboiler tube surfaces is avoided.

It is a further object of the instant invention to provide a method wherein, if the bottoms product consists of very heat sensitive materials, their contact with the hot reboiler tubes can be prevented altogether.

Briefly, the instant invention concerns a distillation method wherein water is locked into the distillation zone. That is to say, a fixed amount of water is added to the distillation zone and continuously recycled within the distillation system such that only minute quantities of water may be required in addition to that initially added to the distillation zone. The feed stock added to the distillation zone must be immiscible with water. In addition, substantially no water should be included along with the feed stock since this would result in a buildup of water within the distillation zone, something that is totally undesirable to a system such as the one described in the instant invention. Small amounts of makeup water may be added to the system. However, this water is added independently of the feed stock.

The instant invention also provides for the addition of an inhibitor such as sodium nitrite to the water locked into the distillation system so as to prevent clogging in the reboiler tubes or other corrosion or deterioration of the apparatus and materials handled in the system. Due to the inventive feature of the instant invention, which is keeping a fixed amount of water in the system, the inhibitor or sodium nitrite which is added to the system also remains locked in it substantially. This is because the constant recycling of water enables the inhibitor to be recaptured. Other systems wherein water is constantly removed do not provide a similar economy feature.

In addition, other materials such as potassium, ammonia and sodium hydroxides and salts of organic acids may be included with the water to neutralize any acids formed from the breakdown of acid esters and the like in the feed stock and to remove sulfur compounds such as mercaptan and hydrogen sulfide from the feed. Once again, the previously mentioned advantage of keeping these treating agents locked in the system is present since substantially no water is lost from the system.

A further inventive feature concerns the fact that only water may be circulated through the reboiler in the instant invention. This can be accomplished by the strategic placing of a weir in the bottom region of the distillation zone. The presence of the weir allows a settling to take place and separate layers of water and hydrocarbon are formed. Water is then drained off substantially free of any material and is then passed through the reboiler. Due to the fact that only water is being circulated through the reboiler, a higher temperature may be tolerated in the reboiler since hydrocarbon bottoms which are commonly responsible for fouling of reboilers will not be brought into contact with the hot reboiler tubes. Thus, a great deal of expense in cleaning and sparing of reboilers may be avoided.

It is known in the prior art to separate reactive, water miscible fluids containing water by distillation. However, processes of this type are clearly distinguishable from the present invention. Such a process is disclosed in a recent patent issued to W. L. Kuechler, U.S. Patent No. 2,950,232 which was filed May 1, 1957 and issued on Aug. 23, 1960. It is readily apparent that this patent differs substantially from the invention of the instant case. Kuechler is working with a feed which contains water and, therefore, he is adding water to the system continuously along with the feed. The instant invention concerns only the addition of a feed stock which is substantially free of water. Furthermore, Kuechler's feed stock must be miscible with water. This is also contrary to the instant invention. Furthermore, some of Kuechler's feed constituents react chemically with water. Thus, by passing only the aqueous phase containing dissolved feed constituents through his reboiler, he enhances his distillation yield of the desired product. He shows that when both phases are passed through the reboiler undesirable losses of his product occur. As indicated above, the instant invention is not concerned with any chemical reaction and can pass either a mixture of aqueous and organic phases or water alone through the reboiler as described below.

The Kuechler invention is designed to strip water-soluble materials out of water that must be present in the feed. As a result, patentee has to continuously remove the water which is present as a product. If the feed to Kuechler's apparatus were the same as the feed stock which is being utilized in the instant invention, no water would be present in the system, especially not in the reboiler and the bottom of the distillation zone and, therefore, there would be no need to separate the water-soluble products from the water.

In essence, the instant invention concerns a continuous distillation process for the separation of a mixture into two or more fractions. The constituents of said mixture must be essentially immiscible and insoluble in water and the mixture is essentially free of water when entering the distillation system. The reason for this is that the distillation zone has already been filled with water in a separate liquid phase. The water is present in all stages including the bottom of the column. After the mixture is introduced into the water-containing distillation zone, the distillation is allowed to commence and a portion of the mixture passes from the top region of the distillation zone in vapor form. Along with this, one will find some water which is in the vapor phase in amounts set in accordance with the additive vapor pressures of immiscible liquids. The material passing off from the top of the tower with the water is allowed to condense, settle, and since the two are immiscible, water may easily be separated from the other material and returned to the distillation zone. In this manner, water is substantially locked into the system. Small amounts of water may be added to compensate for any minute losses of water which will take place. Typical feed stocks are hydrocarbon mixtures in the $C_2$ to $C_{12}$ range. The overheads are usually $C_6$ or lighter materials, while the bottom streams are generally $C_5$ and heavier. Thus, a $C_3$ to $C_8$ feed may be split into $C_3$ to $C_4$ overhead and $C_5$ to $C_8$ bottoms. Especially preferred feeds are those containing highly unsaturated olefins and diolefins which cannot be exposed to excessive temperatures. This may include streams containing butadiene, isoprene, cyclopentadiene and other conjugated diolefins obtained from high temperature cracking or catalytic dehydrogenation of hydrocarbon feed stocks.

The instant invention is to be distinguished from azeotropic distillation in that water is immiscible with the hydrocarbon mixture in the distillation zone; while in azeotropic distillation, the azeotroping agent is miscible with at least one of the components in the mixture to be segregated and forms an azeotrope which has a boiling point different from one or more of the other constituents in the mixture. The instant invention is to be distinguished from extractive distillation in that the water does not selectively adsorb or remove one of the constituents from the mixture and thus aids in the distillation process by an entirely different phenomenon.

The manner in which the instant invention is to be distinguished from the conventional and steam distillation method will be more apparent hereinafter when the instant invention is discussed in more detail. However, initially, it should be noted that in conventional distillation, no water is added to the distillation system and in steam distillation, a reboiler is not employed and a separate aqueous phase in the tower is avoided. Further objects of this invention will be apparent from the detailed discussion which follows hereinafter.

FIGURE 1 represents a schematic diagram of the distillation method of the instant invention.

FIGURES 2 and 3 represent schematic diagrams of embodiments of this invention.

Though the instant invention may be applied to the distillation of any hydrocarbon mixture, it will be illustrated by the removal of $C_4$ and lighter from a hydrocarbon stream containing $C_2$, $C_3$, $C_4$, $C_6$ and $C_8$ hydrocarbons. Feed is obtained from a suitable source and directed via line 1 into distillation zone 2. As mentioned hereinbefore, distillation zone 2 is identical to the distillation zones which may be employed in conventional distillations, azeotropic distillation, extractive distillation, and steam distillation. Distillation zone 2 is basically a tower containing packing, plates or trays suitable for the segregation of vapors and liquids and intimate contacting of these vapors and liquids in their travel upward or downward, whichever the case may be. The distillation zone 2 will, however, be equipped with trays or plates suitable for a liquid layer which has two phases. Suitable trays would be bubble cap trays, provided the overflow weir has proper openings for the passage of the usually heavier aqueous layer, also sieve, jet, or ripple trays, discs and donuts, as well as rotating disc or other mechanical devices conventionally used in distillations. Thus, the particular construction of distillation zone 2 with these trays is a matter of choice well within the ordinary skill of one in the art and in no way represents the inventive aspect of the instant invention. Water is added to the distillation zone via line 3 independent of the feed stock in amounts suitable to satisfy the holdup requirements of the system for water and to ensure the presence of a liquid water phase in the reboiler or its equivalent during steady-state operation. After a suitable amount of water has been added to distillation zone 2, the water intake is terminated and the water locked into the distillation system except for minor amounts of water purge and makeup in order to (a) makeup for water of solution and carry-over in the product streams and (b) prevent the buildup of undesirable impurities in the aqueous phase due to feed contaminants or chemical reaction in the tower.

During the distillation process, overhead vapors will be removed from zone 2 via line 4 and directed to condenser 5 which is cooled by indirect cooling means, such as water, air or another process stream. The coolant for condenser 5 is directed through condenser 5 by means of line 6. The condensed material is removed from condenser 5 via line 7 and passes to settler 8 wherein the hydrocarbon phase and usually a very small amount of water phase are segregated. The water is withdrawn from settler 8 via line 9' and recycled to distillation zone 2 via line 9. Thus, the water is locked into the distillation system. The hydrocarbon layer is withdrawn via line 10 and a portion thereof recycled via lines 11 and 9 to the distillation zone. The remaining portion of the hydrocarbon is withdrawn as product through line 10.

The liquids in the distillation zone flow downwardly therein and collect in the bottoms of the zone. In so doing, there is formed a layer of hydrocarbon on top of a layer of water in the bottom of the tower. This may be done by placing a baffle 12 between the weir 13 and the outlet 14, whereby the bottoms liquid may only flow under the baffle 12. This forms a quiescent zone to the left of baffle 12 wherein the hydrocarbon and water will stratify with the hydrocarbon being on top of the water. Thus, line 14 will withdraw from the distillation zone the liquid bottoms hydrocarbon product. Water, together with additional bottoms, is withdrawn via line 18 and directed to reboiler 15 wherein it is heated to the bubble point of the mixture. The resultant vapor-liquid mixture is withdrawn from the reboiler 15 via line 16 and directed back to distillation zone 2. Steam may be employed as the heating means in reboiler 15 and enters and is withdrawn therefrom by means of line 17. The bottoms 18 may pass through the interior of the tube or on the shell side in the shell and tube heat exchanger serving as reboiler 15.

There are many advantages to the system just described. However, the primary advantage is effecting separations at lower temperatures than heretofore required. In the instant process, both liquid water and liquid hydrocarbons are on the trays. This lowers the bubble point of the hydrocarbon mixture on the tray and thus one is able to effect separation of the components on any particular tray at a lower temperature than was heretofore obtained in either conventional distillation or in steam distillation.

Steam distillation, on the other hand, is generally not carried out with hydrocarbon materials boiling lower than water, in order to avoid the condensation problem. Condensation of water does become a problem when it occurs in a bubble-cap tower which is not set up to handle water as a separate phase. Water will tend to accumulate on the plates as a layer, displacing the hydrocarbons and leading to inefficient contacting between vapor and liquid. However, steam distillation is frequently used on heavier hydrocarbons (say in the $C_{8+}$ range), such as in sidestream strippers on pipestills and in the bottoms stripping sections of crude oil or catalytic cracker product fractionators. In contrast to the present invention, no separate water phase is present in the bottom of these towers and care is taken to the maximum possible extent to avoid any condensation of water.

Therefore, the instant invention has the following advantages over ordinary steam distillation. First, it can be carried out at any pressure, independent of the pressure of the steam supply in the plant. Secondly, in general, the steam contributing to the partial pressure lowering in the bottom will condense on its way up to the tower, and will reflux back to the bottom as water. Thus, essentially no additional condenser duty will have to be installed to condense the diluent steam. While in conventional steam distillation, this can amount to an appreciable cooling load. Thirdly, instead of merely acting as a diluent, the steam in the bottom of the tower generates reboil vapors as it condenses and gives up latent heat. In conventional steam distillation, this is not the case. Lastly, since ordinary steam distillation involves the addition of fresh steam to the system, a considerable amount of condensate will have to be removed from the tower, requiring extensive treatment. In the instant invention, water is locked in the tower as described, and no condensate treating facilities will be required.

The specific advantages of the instant invention are readily seen when one compares the conditions which would be required to be employed in a conventional distillation system employing basically the same apparatus in relation to the temperature and pressure conditions employed in the instant invention. Operating the debutanizer at a pressure of 154 p.s.i.g. and recovering an overhead condensed product at 100° F. with the same $C_2$ to $C_8$ feed discussed above would require a bottoms temperature of 380° F. in a conventional (dry) distillation system. With water locked in the tower, as in the instant invention, the bottoms temperature dropped to 310° F. In the conventional case, a furnace would have been required, while 125 p.s.i.g. steam suffices for the reboiler of the tower operating as described in the present invention. A considerable saving in investment as well as in operating cost can thus be realized. Besides the 70° F. lower bottoms temperature, the present invention decreases the reboiler duty by 30%.

Furthermore, caustic, ammonia or some other basic material such as an alkaline metal soap and the ammonia or sodium salts of organic acids may be added to the water to effect neutralization of acidic constituents in the feed or formed from the feed during distillation such as hydrogen sulfide, sulfuric acid (from ester breakdown after $H_2SO_4$ extraction or alkylation), etc.

Likewise, an oxidation inhibitor such as sodium nitrite may be added to the water to prevent clogging of the reboiler tubes due to polymer deposition.

FIGURE 2 represents an embodiment of the instant invention wherein the water and hydrocarbon bottoms are separated prior to passing into the reboiler. Distillation zone 20 is similar to zone 2, with the exception that it does not contain baffle 12 and outlet 14. The water, mixture feed and the overhead condensing and recycle systems cooperating therewith, however, are identical to that shown in FIGURE 1 but have not been shown in FIGURE 2 to simplify the latter. In this embodiment, the bottoms 22 is directed to a separator 21 wherein the hydrocarbon and water layers are segregated. This separator can be an integral part of tower 20. The hydrocarbons are withdrawn therefrom via line 24 while the water phase is withdrawn via line 23 and passed through reboiler 26. In reboiler 26, the water is heated and may be converted substantially or partially to vapor form and recycled via line 27 to the distillation zone 20. The heating medium such as steam, hot oil, etc. is passed through reboiler 26 by means of line 25. Reboiler 26 may be a shell and tube heat exchanger or its equivalent with the water passing through the interior of the tubes. Of course, it can also be a furnace. This embodiment prevents the hydrocarbons from contacting the tubes of the heat exchanger and thus substantially decreases clogging of the heat exchanger tubes due to polymerization or other degradation of heat sensitive material at the high tube wall temperatures.

In the embodiment shown in FIGURE 3, the reboiler zone 32 affords both a heating and separation zone. Distillation zone 30 may be similar in all respects to zone 20 discussed hereinabove. The bottoms therefrom is withdrawn by line 31 and directed to reboiler zone 32 wherein it contacts the heating medium passing through heating coils 34. The heating medium may be steam, hot oil, or it may be a furnace as discussed previously. In addition, there is located within reboiler 32 a baffle 35 which extends across the reboiler but is placed above the floor of the reboiler. Liquid in the reboiler zone passes beneath the baffle into a quiescent zone 36 wherein the hydrocarbon and water separate because of their immiscibility. The hydrocarbon is withdrawn from the quiescent zone via line 33 and is bottoms product. The vapor produced in zone 32 is recycled via line 37 to distillation zone 30. In all other respects the system is identical to that discussed in FIGURE 1.

It should be noted that the above discussions pertain to a hydrocarbon lighter than water. If the material to be distilled is heavier than water, the draw-off points have to be adjusted accordingly.

The present invention, employing locked water in the distillation system, can be used to good advantage in a number of related applications. For example, where it is desired to "cascade" a number of distillation columns (by using the latent heat of condensation in the condenser of tower A to supply the latent heat of evaporation to the reboiler of tower B), then the use of locked water in tower B lowers the bottoms temperature in B and facilitates the heat exchange considerably. Frequently, this heat exchange is only possible if water is locked in B.

Also, when a tower handling high boiling bottoms (say $C_6$ up) has to operate at elevated pressure in order to feed the overhead as a vapor into another high pressure tower, water locking is a very effective scheme to keep the bottoms temperature within reason (safely below the critical temperature).

If vapor recompression is used to supply reboiler heat by compressing the overhead before condensation against the bottoms liquid, locked water may save compressor horsepower requirements since it brings the overhead and bottoms temperature closer together than they would be without water present.

Though the instant invention has been discussed with particular reference to a debutanizer system, it is apparent that it may be employed in the fractionation of any hydrocarbon mixture, or as a matter of fact, of any mixture of compounds which are immiscible with water and vice versa, and which do not react with water at the temperatures of the distillation system. Thus, mixtures of higher alcohols, i.e., oxo alcohols, halogenated hydrocarbons, etc., can be distilled in the same manner.

What is claimed is:

1. A continuous distillation process for separation of a mixture into two or more fractions, the constituents of said mixture consisting of $C_2$ to $C_{12}$ hydrocarbons essentially immiscible and insoluble in water, the said mixture being essentially free of water which comprises introducing said mixture into a multi-stage distillation zone in which water exists as a separate liquid phase on all stages including the bottom of the said zone, passing a portion of said mixture and a portion of said water, substantially in the vapor phase, out of the top region of said tower, condensing said vapor phase separating said water and said portion and returning substantially all of said water that was removed from said distillation zone back to said distillation zone.

2. The process according to claim 1 in which the amount of water in the column is maintained at a contant level by the introduction of additional water to the said zone.

3. The process of claim 1 wherein the water contains a compound selected from the group consisting of sodium and potassium hydroxide, ammonia and sodium salts of organic acids.

4. The process according to claim 1 wherein said water contains an oxidation inhibitor.

5. The process according to claim 4 wherein said oxidation inhibitor is sodium nitrite.

6. The process according to claim 1 wherein at least a portion of the water is removed from the bottom of the said distillation zone, passed through a reboiler and returned to the bottom region of the said distillation zone.

References Cited

UNITED STATES PATENTS

| | | | |
|---|---|---|---|
| 2,408,011 | 9/1946 | Walsh | 203—7 XR |
| 2,476,010 | 7/1949 | Whittlesey | 208—348 XR |
| 2,613,175 | 10/1952 | Johnstone | 203—53 XR |
| 2,671,322 | 3/1954 | Barry | 202—153 XR |
| 2,681,306 | 6/1954 | Kemp | 203—96 |
| 2,702,784 | 2/1955 | Rossi | 203—85 XR |
| 2,762,760 | 9/1956 | Walker | 203—96 |
| 2,900,311 | 8/1959 | Montagna | 203—5 |
| 2,950,232 | 8/1960 | Kuechler | 203—84 |
| 3,048,373 | 8/1962 | Bauer | 202—163 XR |
| 2,487,184 | 11/1949 | Rupp | 203—97 |

FOREIGN PATENTS 717,955   9/1965   Canada.

OTHER REFERENCES

A. Sharples, Reverse Osmosis, Science Journal, August, 1966, pp. 38–43 (particularly p. 39).

NORMAN YUKOFF, *Primary Examiner.*

D. EDWARDS, *Assistant Examiner.*

U.S. Cl. X.R.

203—6, 36, 37, 38, 96; 208—358